US006862522B2

(12) United States Patent
Brynielsson

(10) Patent No.: US 6,862,522 B2
(45) Date of Patent: Mar. 1, 2005

(54) METHOD FOR AUTOMATICALLY ESTABLISHING AND UPDATING A TABLE OF DISTANCES

(75) Inventor: Thore Brynielsson, Kullavik (SE)

(73) Assignee: Thoreb AB, Västra Frölunda (SE)

( * ) Notice: Subject to any disclaimer, the term of this patent is extended or adjusted under 35 U.S.C. 154(b) by 0 days.

(21) Appl. No.: 10/381,842

(22) PCT Filed: Sep. 28, 2001

(86) PCT No.: PCT/SE01/02092

§ 371 (c)(1), (2), (4) Date: Jul. 10, 2003

(87) PCT Pub. No.: WO02/27273

PCT Pub. Date: Apr. 4, 2002

(65) Prior Publication Data

US 2004/0054453 A1 Mar. 18, 2004

(30) Foreign Application Priority Data

Sep. 29, 2000 (SE) .............................................. 0003526

(51) Int. Cl.[7] ................................................ G01C 21/26

(52) U.S. Cl. ......................... 701/207; 701/35; 701/300; 340/993

(58) Field of Search ................................. 701/200, 207, 701/35, 201, 214, 300; 340/433, 988, 993, 994

(56) References Cited

U.S. PATENT DOCUMENTS 4,382,178 A * 5/1983 Mori ........................... 377/17
5,987,378 A 11/1999 Schipper et al. ............ 701/207
6,037,881 A 3/2000 Bornhauser et al. ........ 701/217

FOREIGN PATENT DOCUMENTS

| | | |
|---|---|---|
| EP | 0191681 | 8/1986 |
| FR | 2469079 | 5/1981 |
| FR | 2510787 | 2/1983 |
| GB | 2130374 | 5/1984 |

* cited by examiner

*Primary Examiner*—Gertrude A. Jeanglaude
(74) *Attorney, Agent, or Firm*—Harness, Dickey & Pierce, PLC

(57) ABSTRACT

The present invention relates to a method for automatically establishing an updating a table of distances by means of a vehicle which is equipped with a computer unit and a trip meter, which vehicle is driven along a route extending past a group of predetermined stops which are represented in a list stored in a computer unit. Each time the vehicle stops at a stop, the computer unit receives from the trip meter data which represents a distance that has been covered since the preceding stop. If the list lacks information about said distance, the data is stored in the list associated with the current location, whereas if the list already contains information about said distance, the data is allowed to affect the information by suitable statistical processing. By means of this method, a table of distances is automatically established, and is also updated each time the vehicle stops at a location along the route. During one single driving, a new route can thus be given complete distance information, which in future makes correct stop call-outs etc. possible.

10 Claims, 3 Drawing Sheets

METHOD FOR AUTOMATICALLY ESTABLISHING AND UPDATING A TABLE OF DISTANCES

FIELD OF THE INVENTION

The present invention relates to a method for automatically establishing a table of distances by means of a vehicle which is equipped with a computer unit and a trip meter, which vehicle is driven along a route which extends past a plurality of predetermined locations which are represented in a list stored in a computer unit.

In particular, the invention is intended to facilitate collection and updating of information regarding distances between stops in a public transport network.

BACKGROUND ART

Solutions for the distribution of traffic information in a public transport system are available on the market. One example of such a system is the AB Thoreb KomFram system which is successfully used in Europe, the USA and Asia. One problem with such systems is to establish databases having information about the routes along which the vehicles in the system are running; information which is subsequently used, for example, to procure information about between which stops a vehicle is positioned. The information consists of, among other things, tables of distances, i.e. lists with stops along different routes and the distances between the stops.

Nowadays, the most common method for establishing these tables of distances is simply to drive a measuring vehicle along the route and manually note the distances. These notes are then transferred to the database of the system in a suitable way. Although such recording of distances in a transport network can be provided relatively easily, it is not satisfactory for very long since the routes usually change. In a public transport network in a city, it is a matter of several changes every year, on the one hand, due to permanent re-routings and, on the other, due to temporary interference, such as road work. It is comprehensive work to keep the lists of distances continuously updated and, especially in the case of minor changes, there is a great risk that it is not done. The information in the system is thus degraded, which results in a risk of erroneous traffic information.

In addition, the above-described method of providing the system with information is impaired by several sources of errors. Reading from a vehicle, which typically takes place manually by looking at the trip meter of the vehicle, is difficult to make exact. When these notes are later transferred to the database, there is a risk of misreading and mistyping.

An alternative to providing the system with information about the distance between stops is to use GPS equipment in order to know continuously approximately where a vehicle is positioned. However, the disadvantage of GPS is that information about the position of the vehicle is sent only at predetermined intervals, and between these points the vehicle advances relatively far (up to about 30 m) and also the accuracy of the GPS system of +/−15 m has to be taken into consideration. Another disadvantage of GPS is that in cities with high buildings, for example in New York and Singapore, great problems may arise. Since the radio signal from a GPS satellite in such cities with high buildings sometimes does not reach the GPS receiver directly but indirectly via reflection into the front of a building or the like, the GPS receiver may exhibit considerable errors. A system is thus desirable which is more closely connected to information available in the vehicle's own information system.

A new driver needs to learn the different routes which he or she is to use and memorise them. To this end, a driving instructor, who knows the routes well, usually accompanies the new driver a number of trips until the new driver has been trained. This is very expensive for a transport company. The method has to be repeated for every new driver who is employed with the purpose of driving a bus in a predetermined area or traffic section.

OBJECTS OF THE INVENTION

One object of the present invention is to solve the above-mentioned problem and facilitate the provision of information quantities for a traffic information system.

Another object is to allow automatic updating of information in a traffic information system.

SUMMARY OF THE INVENTION

These objects are achieved by means of a method of the type stated by way of introduction, according to which each time the vehicle stops at a location, the computer unit is automatically activated and receives from the trip meter first data representing the distance that has been covered since the preceding location. If said list lacks information about said distance, said first data is stored in said list, associated with the current location. On the other hand, if said list already contains information about said distance, said first data is allowed to affect said information by suitable statistical processing.

By means of this method, a table of distances is automatically established and is also updated each time the vehicle stops at a location along the route. During one single driving, a new route can thus be given complete distance information, which in future makes correct stop call-outs etc. possible.

Since the method uses information about the motion of the vehicle relative to the ground, instead of its motion relative to a fixed system of coordinates (such as a map or a navigation system), the distances in the table will better reflect the actual situation.

A trip meter (odometer) means all types of equipment which can read the motion of the vehicle and this information can comprise measuring of time between the locations. Such information can be used to create a relationship between distance and time between the locations in the table and how this relationship is changed during different intervals during 24 hours. (For example, during rush-hours more time is probably required to travel from one location to another.)

The term distance relates to both time and space and can be measured in all spatial dimensions. Thus, it may sometimes be relevant to complete a conventional distance indication, for example measured by a trip meter, with a more strictly defined distance in relation to a predetermined system of coordinates, for example expressed as a difference in x and y coordinates.

The table of distances can further comprise a second group of predetermined locations which each are associated with a distance to one of the locations in the first group and with an activity that is to be performed by the driver at this location. The computer unit can present the information to the driver when the vehicle passes the current location, which can be used to assist an un-trained driver when he or she drives the vehicle. Since these locations are related to the last-passed location of the first group, the information is independent of changes in the route before this last-passed location. By continuously keeping the distances between the locations of the first group updated, said information will in all probability be presented at exactly the right moment.

According to a more complete embodiment, the vehicle further comprises a navigation unit such as a GPS unit, and each time the vehicle stops at a location, the computer unit receives from the GPS unit second data which represents the current position coordinates of the vehicle. If said list lacks information about said position coordinates, said second data is stored in said list in connection with the representation of the current location, and if said list already contains information about said position coordinates, said second data is allowed to affect said information by appropriate statistical processing.

The table which is provided according to this method thus contains detailed information about both distances between locations and the coordinates of the locations.

Preferably, the computer unit is activated by sensing a signal which indicates that the doors are opened. This signal usually arises only when the vehicle arrives at the predetermined locations and, thus, constitutes a suitable activation signal.

If the vehicle passes a predetermined location without stopping, the driver can manually activate the computer unit in order to thus maintain the correct order in the list. This is especially important the first time the vehicle is driven along the route since no distance is then stored in the list. Subsequently, it is not that necessary since the computer unit itself can determine, based on the stored distance, that the stop has been passed.

The statistical processing can comprise calculation of a moving average, suitably completed with sensing of step changes so that changes in a route can be identified.

BRIEF DESCRIPTION OF THE DRAWINGS

In the following, embodiments of the invention that are currently preferred will be described in more detail with reference to the accompanying drawings.

DESCRIPTION OF A PREFERRED EMBODIMENT

Figure 1:
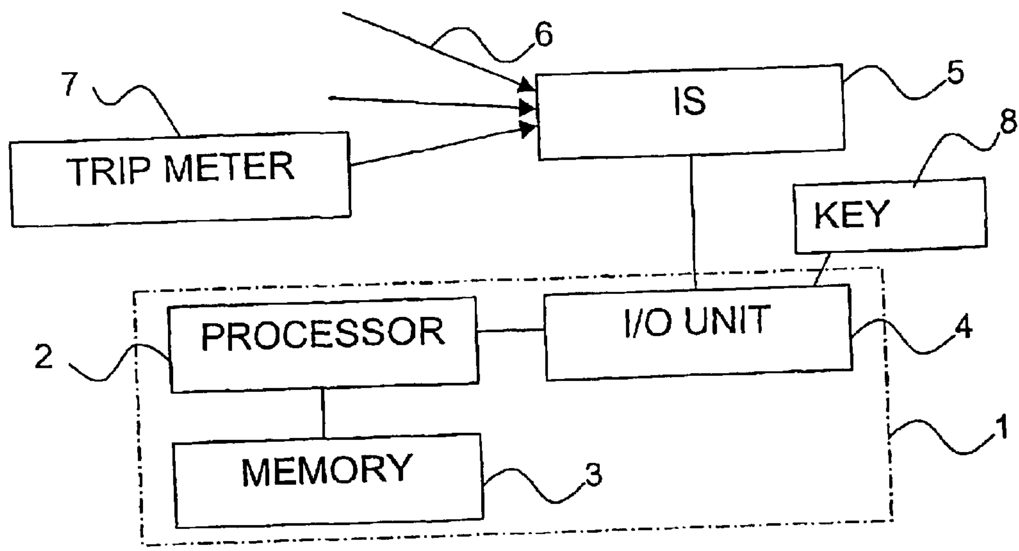
FIG. 1 shows a block diagram of part of the equipment in a vehicle.

The embodiments described below refer to a public transport system having a plurality of vehicles, such as buses. Each bus is provided with a computer unit 1, which comprises a processor 2, a memory unit 3 and means 4 for communicating with the internal information system 5 of the bus (for example, an ELSY system from AB Thoreb), the information system receiving signals 6 from the different parts of the vehicle, for instance, from the trip meter 7.

Figure 2:
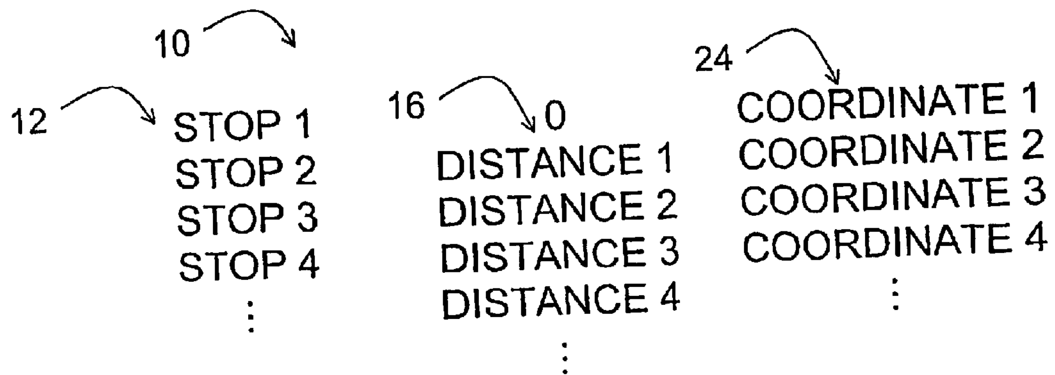
FIG. 2 shows an example of a table of distances.

According to the invention, each vehicle is provided with a table 10 of the type shown in FIG. 2, the table being stored in the memory unit 3. The table 10 contains a sequence of stop denominations 12 which correspond to the stops along the route along which the vehicle runs. It should be noted that the term route here does not necessarily correspond to, for instance, the number of a bus service, but a bus service can very well have several different variants which all have different routes. Two variants can differ very little, maybe by only a single stop, and new variants can arise by a stop being withdrawn or a new stop being established. A route thus contains a sequence of stops that the vehicle uses, in the correct order.

The denominations of the stops in the table can, for example, consist of the respective stop names but can alternatively consist of more anonymous designations, such as combinations of letters or combinations of numbers. It is essential that each stop should have a unique denomination since this allows central handling of the existing routes. Apart from the stop denominations, the table can contain further information associated with the stop, such as sound files with stop call-outs.

The table can be stored in the computer unit in a plurality of ways, for example, by radio transmission from a central database. This method is advantageous since it allows central handling of changes in routes. Different vehicles that are included in the system can transfer to the respective computer units the route/routes they use and, subsequently, regularly update these. When a vehicle temporarily is used along another route, it is also easy to transfer this route from the database.

Apart from the names of the stops along the route 14, the table contains the distances 16 between the successive stops 18, 19. By simply collecting information from the trip meter 7 about the distance covered since the preceding stop 18, the computer unit 1 of the vehicle can thus determine when the next stop 19 has been reached. If a stop is passed without the vehicle stopping, this can be noted and the information system 5 of the vehicle all the time knows to which stop the vehicle is going. Therefore, the information in the table 10 can be used in the vehicle, for example, to communicate the next stop to the passengers.

Also an accumulated distance counted from the initial stop, and/or another reference stop, can be stored in the table, which provides a further possibility to the computer unit to monitor to which stop the vehicle is going.

As already described, information about distances has previously been obtained manually by routines that are circumstantial and sensitive to errors. In the following, a method according to the invention will be described, which in an automatic and self-training manner establishes the table with the required distances and also continuously updates the table.

In a first step 30 an empty list is created, i.e. a list which only contains the names of the stops and possibly further information, for example, sound files with stop call-outs. This process constitutes a sort of preliminary work for the acquisition of distances and needs to be performed only once. Subsequently, new routes/route variants can usually be provided by editing already available routes. Suitably, all the lists are stored in a central database so that they can be communicated to the respective vehicles. However, this does not exclude the possibility for a driver to edit a table which has been transferred to a vehicle, for example, if a stop is cancelled at short notice.

Such an "empty" table, which in step 31 is stored in the computer unit of a vehicle, thus lacks information about the distances between the stops. This information is created during the first trip of the vehicle along the current route.

When the vehicle is driven (step 32), the computer unit steps forward in the table as the vehicle stops (step 33) at a stop. The computer unit is activated in step 34 by a signal from the internal information system 5 of the vehicle, which signal unambiguously indicates that the vehicle has stopped at a stop. According to a preferred embodiment, the signal which indicates that the doors have been opened is for example used as an indicator. At each stop, a value is obtained in step 35 from the trip meter 7, which indicates how far the vehicle has driven since the preceding stop. In step 36 it is checked whether the table 10 lacks information about this distance and, if that is the case, the value is stored 37 in the computer unit 1. As soon as the vehicle has run along the whole route once, there is thus a first table of distances stored in the memory unit.

By stepping forward the table at each stop, the computer unit all the time "knows" where the vehicle is positioned, or at least, to which stop it is going, even before the distances between the stops have been stored. If the vehicle during the first trip passes a stop without stopping, for example, because no passenger desires to step off or on, the driver indicates this by means of specifically established equipment, for instance, a press button 8 which is connected to the computer unit. By means of the table of distances, the computer unit can henceforth automatically note when a stop is being passed, and said equipment therefore does not need to be used until a new route is to be run. Nor is such equipment necessary, but the driver can simply during the first trip along a route stop at each stop even if nobody desires to step on or off.

From now on, when the vehicle is driven along the same route, the check in step 36 will turn out negative, i.e. information about the distance from the preceding stop is already available. The recently measured value is then used to process (step 38) the stored value in a suitable manner, and possibly update (step 39) the stored value.

Figure 3:
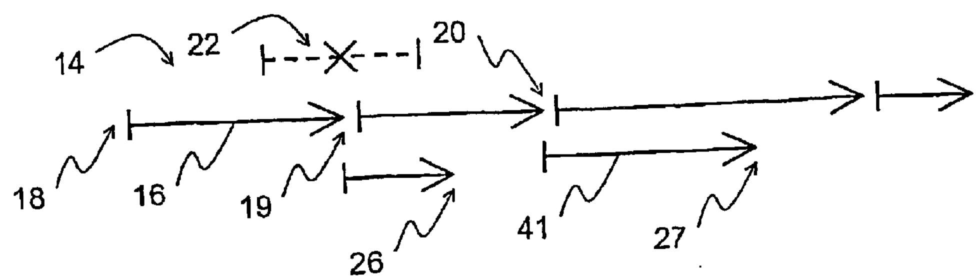
FIG. 3 shows a route.
Figure 4:
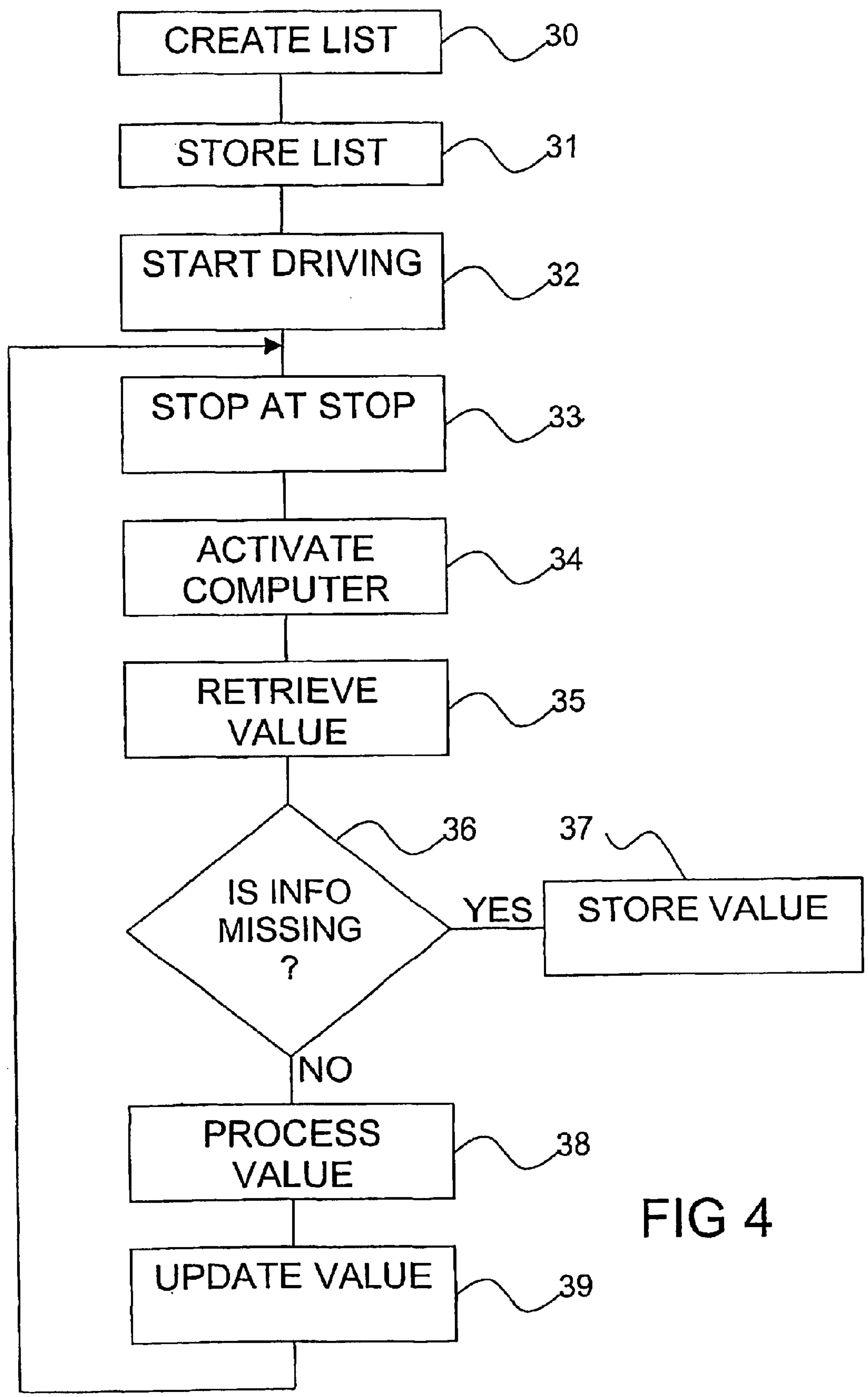
FIG. 4 shows a flow chart of a method according to an embodiment of the invention.

A great advantage of a system according to the invention becomes evident when the distance between two stops changes, for example, due to the laying out of a new road. Since the system continuously records each stop and stores the measured distance which has been covered since the preceding stop, a deviation can be noted. A suitable algorithm can be used to adjust the stored distance value in accordance with measured, actual data. For example, it may be suitable to apply a form of rolling averaging in order to ensure that the distance value is not affected too much by a single deviating value. Alternatively, the average value and the standard deviation can be calculated based on a very large number of values, essentially unlimited with modern data storage performance. With reference to FIG. 3, the standard deviation 22 represents differences as regards exactly where the vehicle has stopped at the respective stops 18 and 19. The more times the vehicle has covered the distance, the less the average variations.

A measured value which greatly deviates from the current stored value can be ignored so that it does not affect an average value in an erroneous way. At the same time it may be suitable yet to store this deviating value, and if this greatly deviating value is repeated several times with a small mutual deviation, this should conveniently be taken into consideration. This indicates that the distance really has changed in relation to the stored average value (maybe the stop has been moved) and then updating should take place. The previous values can be stored since, for example, a temporary traffic diversion ceases after some time and then this can be discovered by the computer unit via its programming. It is also possible that the system will function correctly even faster (directly after the first trip after the traffic diversion) if the driver via the display and the keyboard of the vehicle computer, for example in response to a question from the vehicle computer (when a great deviation as regards distance is indicated), by pressing a key can choose an alternative, for instance, "temporary traffic diversion".

According to one embodiment of the invention, also the coordinates 24 of each stop are stored in the table. These coordinates can be retrieved from a navigation unit in the vehicle, for example, a GPS receiver. These coordinates can be collected and kept updated in more or less the same manner as has been described with respect to the distances 12 in the table.

Figure 5:
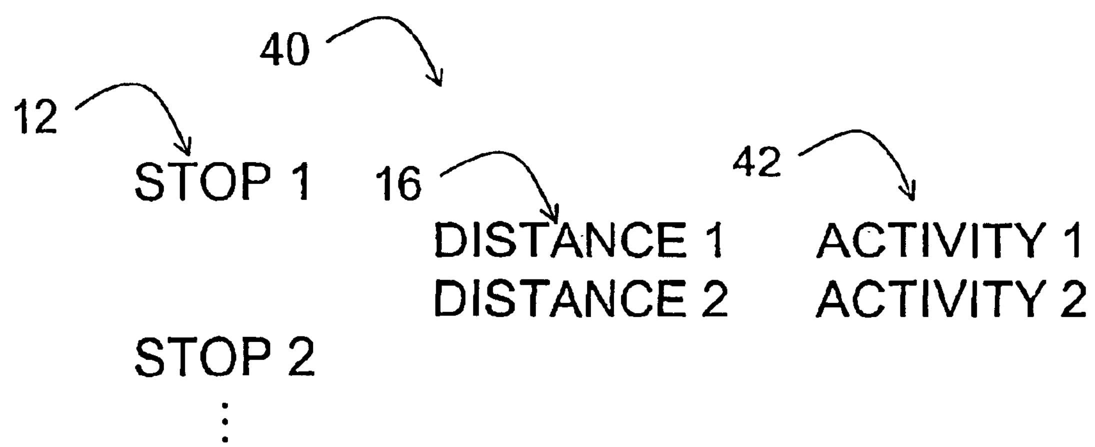
FIG. 5 shows another table.

The locations which are stored in the computer unit 1 are not limited to stops 18, 19, 20 along the route. They can also comprise other locations, which can be used to provide an "automatic driver assistant". The table of distances is completed by a number of locations 26, 27, represented in the form of distances 41 from the very preceding stop 19, 20, where a certain activity 42 usually is to be performed by the driver. Examples of activities can be turning right in 50 m, changing lanes, observing duty to give way, sending a radio message etc. Conveniently, the inputting can be made manually by an experienced driver who during a trip via the keyboard of the vehicle computer indicates activities 42 at suitable locations 26, 27 along the route which are thus automatically stored. These distances 41 and the associated activities 42 are suitably stored in a separate table 40 (see FIG. 5) which is handled by the computer unit in connection with the previously described table of distances 10 in FIG. 2. From now on, when the vehicle passes a thus indicated location between two stops 12, the computer unit will draw the driver's (who then may be a new, inexperienced driver) attention to the activity which is to be carried out, for example, by means of a symbol on a display. It may also be a question of an activity which the vehicle equipment henceforth has to carry out automatically at the location concerned, for example, sending a radio message with a request for priority in the next crossing or sending information about a new zone to ticket equipment.

A suitable way to obtain all the initial information for a table with distances between stops and a list of activities, indicating activities at predetermined locations, is to let a driving instructor drive along the route, preferably slowly, one single time and then, on the one hand, stop at each stop and, on the other, enter the activity symbols at the locations between the stops where the driving instructor finds it suitable to tell a driver that a certain activity is to be performed when the vehicle is driven along the route. If this is made accurately, a new bus driver should be able to drive along a route which is completely new to him or her without the assistance of a driving instructor. This eliminates considerable costs of training new drivers and reduces the risk of a driver driving along the wrong route. If this method is used to acquire the initial values, the result can be transferred to a central system which, for example, transfers the information to other vehicles serving the same route.

During the first trip along a route (with the driving instructor), another way of creating a list with driving instructions is to let the system itself note when the direction indicators (flashers) of the bus are activated. This can take place completely automatically if the bus has, for example, an ELSY system from AB Thoreb. The driving instructor then has to be careful to use flashers when he or she drives the first trip along a route.

Figure 6:
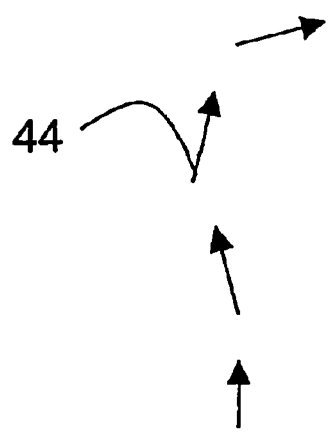
FIG. 6 shows information about the direction of driving according to an embodiment of the invention.

If the vehicle has navigation equipment, for example, it is possible to store in a table the direction of travel, for instance, every 3 meters. The vehicle computer can then from this table read future, expected directions of travel and on a display draw a polygonal lines 44 for these future directions of travel, thereby providing easy driving instructions (see FIG. 6). Usually, the GPS coordinates are received once per second and the vehicle then obtains an indication of direction usually every 3–20 meters as long as it runs. When the bus has run the trip a number of times, the equipment has enough data to show a neat polygonal line on a driver display or the like. Also in this case a self-training subsystem is obtained since the data becomes better and better.

Those skilled in the art can without any problems implement a method according to the above-described embodiment by using generally available computer equipment (a processor and a memory device). Automatic obtaining of information (a signal which indicates stops, measured distances, etc.) does not constitute a problem either and is further facilitated if the vehicle has an internal information system.

In addition, those skilled in the art can be expected to form variants and modifications of the above-described method, without deviating from the inventive idea as defined in the claims. For example, many other types of information can be stored in the table 10 and be connected to the distances 16. A number of other more advanced methods for processing obtained information about distances can also be employed. The user interface, which is not here discussed in more detail, can be formed in a suitable manner and allow different degrees of interaction with the driver. As mentioned above, the driver can be allowed to manually indicate if a stop has been passed, but his or her possibilities should not be seen as limited hereto.

What is claimed is:

1. A method for automatically establishing and updating a table of distances by means of a vehicle which is equipped with a computer unit and a trip meter, which vehicle is driven along a route extending past a first group of predetermined locations which are represented in a list stored in the computer unit, wherein each time the vehicle stops at a location of said first group, the computer unit is automatically activated and receives from the trip meter first data which represents a distance that has been covered since the preceding location of said first group, if said list lacks information about said distance, said first data is stored in said list associated with the current location, and if said list already contains information about said distance said first data is allowed to affect said information by suitable statistical processing.

2. A method as claimed in claim 1, wherein the list further comprises a second group of predetermined locations, each of which is associated with a distance to one of the locations of said first group and with an activity which is to be performed by the driver or automatically by equipment in the vehicle at this location.

3. A method as claimed in claim 1, wherein the vehicle further comprises a navigation unit, and wherein, each time the vehicle stops at a location, the computer unit receives from the navigation unit second data which represents the current position coordinates of the vehicle, and if said list lacks information about said position coordinates, said second data is stored in said list in connection with the representation of the current location, and if said list already contains information about said position coordinates said second data is allowed to affect said information by suitable statistical processing.

4. A method as claimed in claim 1, wherein the computer unit is activated by sensing a signal which indicates that the doors are opened.

5. A method as claimed in claim 1, wherein the driver manually activates the computer unit when the vehicle passes a predetermined location without stopping.

6. A method as claimed in claim 1, wherein said statistical processing comprises calculation of a moving average.

7. A method as claimed in claim 1, wherein said statistical processing comprises sensing of step changes so that changes in a route can be detected.

8. A method as claimed in claim 1, wherein said statistical processing comprises storage of previous values which have been updated to new values in order to make it possible to return to these previous values.

9. A method as claimed in claim 1, wherein the vehicle is intended for public transport and said predetermined locations are stops in a public transport network.

10. A method as claimed in claim 1, wherein said representations of locations constitute names of stops.

* * * * *